Patented Feb. 14, 1933

1,897,638

UNITED STATES PATENT OFFICE

IRVING D. HUBBELL, OF SAN FRANCISCO, CALIFORNIA, ASSIGNOR TO SILICA COMPANY OF CALIFORNIA, LTD., OF SAN FRANCISCO, CALIFORNIA, A CORPORATION OF CALIFORNIA

PURIFYING ART

No Drawing.    Application filed March 4, 1930. Serial No. 433,184.

This invention relates to the purification of silica sand, which is contaminated with iron and perhaps other impurities.

Ordinarily, the contaminating iron is present in such sand mostly in the form of oxide, etc., which is intermixed with the sand or forms a coating on the grains thereof. Silica is used in a great many processes and in the manufacture of various products; and the impurities therein frequently are undesirable in view of the manner in which they affect the process or color the product.

I have discovered that the impurities, for example such as the iron, may be removed from the sand by suitable treatment with sulphur dioxide, as for example, by dissolution on treatment with an aqueous solution of sulphuric acid containing sulphur dioxide, or by treatment with an aqueous solution of sulphur dioxide alone. The iron can thus be removed from the sand to such an extent as to make such sand much more valuable for use in various processes for making various products, including the manufacture of soluble silicates, the manufacture of ordinary glass, etc.

Some of the iron can be removed by treating the silica sand with sulphuric acid of 30% strength, but the use of acid of such strength is expensive and uneconomical on account of the acid losses due to subsequent washing, etc.

I have discovered that substantially all the iron can be removed from the silica sand by treating it with a weak aqueous solution of sulphuric acid, for example, a solution containing 10% or less of sulphuric acid, and containing about 2% more or less of sulphur dioxide, and that this treatment can be carried out very economically without the necessity of applying heat in the process, so that the treatment can be practiced in the cold, thus saving the expense of heating means and material.

I have also discovered that the iron can be substantially all removed from the sand by proceeding in a similar manner, but using an aqueous solution containing about 4%, or even less, of sulphur dioxide containing no sulphuric acid.

I have discovered further that my process can be carried out very efficiently by providing a number of piles of sand to be treated, pouring the treating solution through one of the piles of sand, and when this solution has percolated through this one pile, it is poured onto a second pile, and after percolation therethrough, it is poured onto a third pile, etc. New treating solution may in the meanwhile be poured onto the first pile and then through the second and third piles, the treating solution being used on consecutive piles of sand until it is exhausted. By this means I treat stationary piles of sand practically on the countercurrent principle, the pile of sand containing the least iron thus being treated with the freshest treating solution. After pouring a new or partially exhausted treating solution through a pile of sand, I prefer to let such pile stand without further treatment for a period of about 6 to 24 hours before treating with further solution, as this permits access of air thereto which seems to have a beneficial effect on the process.

The number of treatments necessary will vary, of course, with the nature of the impurities present, and should be determined by analysis of the sand at different stages of treatment to formulate a rule for sand from a particular source. For sand of one particular source I have found that 20 treatments at the rate of one a day are more than sufficient.

My process is applicable to the treatment of other materials than silica sand, such as kaolin, clay, barytes, feldspar, as well as other materials; and it is applicable also to the removal of any impurities which are dissolved by the treating solutions used.

Having thus described my invention, what I claim and desire to secure by Letters Patent of the United States is:—

1. The process of removing contaminating iron from sand which comprises treating piled sand with an aqueous solution of sulphuric acid of not over 10% strength containing sulphur dioxide.

2. The process of removing contaminating iron from sand which comprises treating piled sand with an aqueous solution of sulphuric acid of 10% strength containing about 2% to 4% of sulphur dioxide.

3. The process of treating silica sand contaminated with iron to remove the iron therefrom, which comprises arranging said sand in a series of stationary piles, pouring a weak solution of sulphur dioxide through one of said piles and then through another of said piles, and pouring another similar solution through said first-mentioned pile and then through said second-mentioned pile, whereby said sand is treated with said solution on the counter-current principle while the sand is stationary, and allowing a period of about six to twenty-four hours to elapse between the treatments applied to each pile.

4. The process of treating silica sand contaminated with iron to remove the iron therefrom, which comprises arranging said sand in a series of stationary piles, pouring a weak solution of sulphur dioxide and sulphuric acid through one of said piles and then through another of said piles, and pouring another similar solution through said first-mentioned pile and then through said second-mentioned pile, whereby said sand is treated with said solution on the counter-current principle while the sand is stationary, and allowing a period of about six to twenty-four hours to elapse between the treatments applied to each pile.

IRVING D. HUBBELL.